United States Patent [19]

Noda et al.

[11] Patent Number: 5,185,729
[45] Date of Patent: Feb. 9, 1993

[54] OPTICAL HEAD WITH IMPROVED TRACKING AND FOCUSING ERROR CAPABILITIES

[75] Inventors: Kazuo Noda; Eiichi Nakamura; Hiroaki Nishiguma, all of Kanagawa, Japan

[73] Assignees: Kabushiki Kaisha Nippon Conlux; NHK Spring Co., Ltd., Japan

[21] Appl. No.: 678,478

[22] Filed: Apr. 1, 1991

[30] Foreign Application Priority Data

Apr. 4, 1990 [JP] Japan .................................. 2-89483

[51] Int. Cl.$^5$ ............................................. G11B 7/00
[52] U.S. Cl. ............................ 369/44.14; 369/44.24; 369/44.23; 369/44.37; 369/44.41; 369/109
[58] Field of Search ............... 369/44.24, 102, 109, 369/112, 44.23, 44.14, 44.41, 44.37, 44.38; 250/201.5

[56] References Cited

U.S. PATENT DOCUMENTS

| | | | |
|---|---|---|---|
| 4,924,079 | 5/1990 | Opheij et al. | 250/201.5 |
| 5,062,094 | 10/1991 | Hamada et al. | 369/44.12 |

*Primary Examiner*—Robert L. Richardson
*Attorney, Agent, or Firm*—Skjerven, Morrill, MacPherson, Franklin & Friel

[57] ABSTRACT

An optical head for reading and/or writing information from and in an optical recording medium having an improved sensor structure for focusing and tracking error detections. A light beam is separated into a 0th-order diffraction light beam and ±1st-order diffraction light beams, and these light beams are impinged upon a recording track of the optical recording medium. The light beams reflected from the optical recording medium is separated into two different directions, and the tracking and focusing error detections are carried out with multi-segment optical sensors which are connected in a complementary manner. As a result, the influence of the tracking error on the focusing error detection is eliminated, and the linearity of the focusing error detection is improved.

5 Claims, 2 Drawing Sheets

OPTICAL HEAD WITH IMPROVED TRACKING AND FOCUSING ERROR CAPABILITIES

TECHNICAL FIELD

The present invention relates to an optical head for recording and reproducing information in and from an optical recording medium, and in particular to an optical head equipped with means for detecting focusing and tracking errors by using three light beams obtained from a common light source as a 0th-order diffraction light beam and ±1st-order diffraction light beams.

BACKGROUND OF THE INVENTION

In a conventionally known high density information recording and reproducing system, information is reproduced from a recording medium such as an optical disk or an optical card by projecting a converging light beam upon the recording surface of the optical recording medium and detecting a light beam reflected therefrom with a light measuring sensor such as a photodiode device. The information is written in a large number of pits formed along a recording track defined in the recording medium. Recording of information in the optical recording medium is carried out by projecting a relatively more powerful light beam such as a laser beam upon such pits and selectively altering their reflective properties according to the information to be recorded.

Since the optical recording medium for such a system generally involves warping and distortions, and may have an eccentricity due to positional errors in the mounting of the optical recording medium, it is necessary to control the position of the optical head so that the light beam from the optical head may accurately follow the recording track and a properly focused condition may be maintained at all times Therefore, it is necessary to detect the focusing and tracking errors of the optical head so that the optical head may be appropriately controlled according to such detected tracking and focusing errors.

There are a number of known structures for detecting focusing and tracking errors. For instance, there is known the three beam method in which a diffraction grating is placed in an optical path of a light beam emitted from a semiconductor laser serving as a light source to produce a 0th-order diffraction light beam and ±1st-order diffraction light beams so that the main light beam reflected from the optical recording medium and consisting of the 0th-order diffraction light beam may be used for detecting focusing errors as well as for reading and writing information and the reflected sub light beams consisting of the ±1st-order diffraction light beams may be used for detecting tracking errors. The tracking error can be detected as the difference between the magnitudes of the sub beams reflected from the recording surface of the recording medium.

Conventionally, the detection of focusing errors in such a three beam method was typically based on the astigmatism method, in which the light spot obtained from the main beam reflected from the recording surface becomes elongated in either one of two mutually perpendicular directions depending on the direction of the focusing error by means of the use of a semi-cylindrical lens in the optical system, and a proper focusing is indicated by the light spot being substantially circular. The light measuring sensor for such focusing error detection consists of a four-segment photodiode, and the focusing error is detected by computing the difference between the outputs from the pairs of the diagonally opposed segments of the photodiode.

However, according to such a known structure, when a tracking error is produced, due to the shift of the main beam in the direction of the tracking error, the focusing error signal tends to be strongly affected by the tracking error. When such cross talk develops between the focusing error signal and the tracking error signal, the focusing control tends to be destabilized, and this leads to the destabilization of the tracking control. In extreme cases, the stable control of the optical head becomes impossible.

Also, the focusing error signal obtained from such a four-segment photodiode has a poor linearity, and an optimum focusing control is difficult to achieve.

BRIEF SUMMARY OF THE INVENTION

In view of such problems of the prior art, a primary object of the present invention is to provide an optical head in which cross talk between the focusing error signal and the tracking error signal can be minimized.

A second object of the present invention is to provide an optical head provided with means for detecting a focusing error with a favorable linearity.

A third object of the present invention is to provide an optical head equipped with improved means for focusing and tracking control which is relatively simple in structure.

These and other objects of the present invention can be accomplished by providing an optical head comprising: a light source; three beam generating means for producing a 0th-order diffraction light beam and ±1st-order diffraction light beams from a light beam obtained from the light source and projecting the diffraction light beams upon an optical recording medium; light deflecting means for separating each of the diffraction light beams reflected by a recording surface of the optical recording medium into two light beams oriented in and along a first light path and a second light path, respectively; first focusing control optical sensor means placed in the first light path a short distance in front of a nominal focal point of the 0th-order diffraction light beam for receiving the 0th-order diffraction light beam; a pair of first tracking control optical sensor means placed on either side of the first focusing control optical sensor means for receiving the ±1st-order diffraction light beams, respectively; second focusing control optical sensor means placed in the second light path a short distance beyond the nominal focal point of the 0th-order diffraction light beam for receiving the 0th-order diffraction light beam; a pair of second tracking control optical sensor means placed on either side of the second focusing control optical sensor means for receiving the ±1st-order diffraction light beams, respectively; and detection means for detecting a focusing error and a tracking error according to outputs from the sensor means and actuating the optical head so as to eliminate the focusing and tracking errors.

In this way, by separating the detected light beam into two parts directed in two directions, and combining the focusing and tracking error signals from the first and second light measuring sensors provided in corresponding light paths of the two parts of the detected light beam in a mutually compensatory manner, a favorable focusing control is made possible without in any way detracting from a stable tracking control that can be achieved by the three beam method. In short, a stable tracking control comparable to that of the three beam method is made possible on the one hand, and the cross talk from the tracking error on the focusing error control signal can be avoided by the knife edge method on the other hand. Further, the mutually compensatory combination of the various sensors allows improvement of the focusing control.

The focusing control may be conveniently achieved by separating the 0th-order diffraction light beam so as to form two semi-circular light spots on the first and second focusing control optical sensor means, respectively, with each of the first and second focusing control optical sensor means consisting of a pair of photoelectric segments divided by a line offset from a center of the corresponding semi-circular light spot. The focusing error may be found as the difference between the outputs from the two segments for each of the parts of the 0th-order diffraction light beam deflected into two mutually different light paths.

According to a preferred embodiment of the present invention, the light deflecting means comprises a mirror having a knife edge extending along the direction of a tracking error, the knife edge separating the ±1st-order diffraction light beams each into a larger light spot and a smaller light spot impinging upon a different one of the first tracking control sensor means and a different one of the second tracking control sensor means, respectively.

Further, the detection means may comprise a first adder for adding outputs from a pair of the tracking control sensor means corresponding to the +1st-order diffraction light beam, a second adder for adding outputs from a pair of the tracking control sensor means corresponding to the −1st-order diffraction light beam, a third adder for adding outputs from a complementary pair of segments of the focusing control optical sensor means, a fourth adder for adding outputs from the other complementary pair of segments of the focusing control optical sensor means, a first substracter for carrying out a subtraction between outputs from the first and second adders, a second substracter for carrying out a subtraction between outputs from the third and fourth adders, and a fifth adder for adding up outputs from the third and fourth adders. Thus, the tracking error signal is given as the output from the first substracter, the focusing error is given as the output from the second subtracter, and the information signal is given as the output of the fifth adder.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
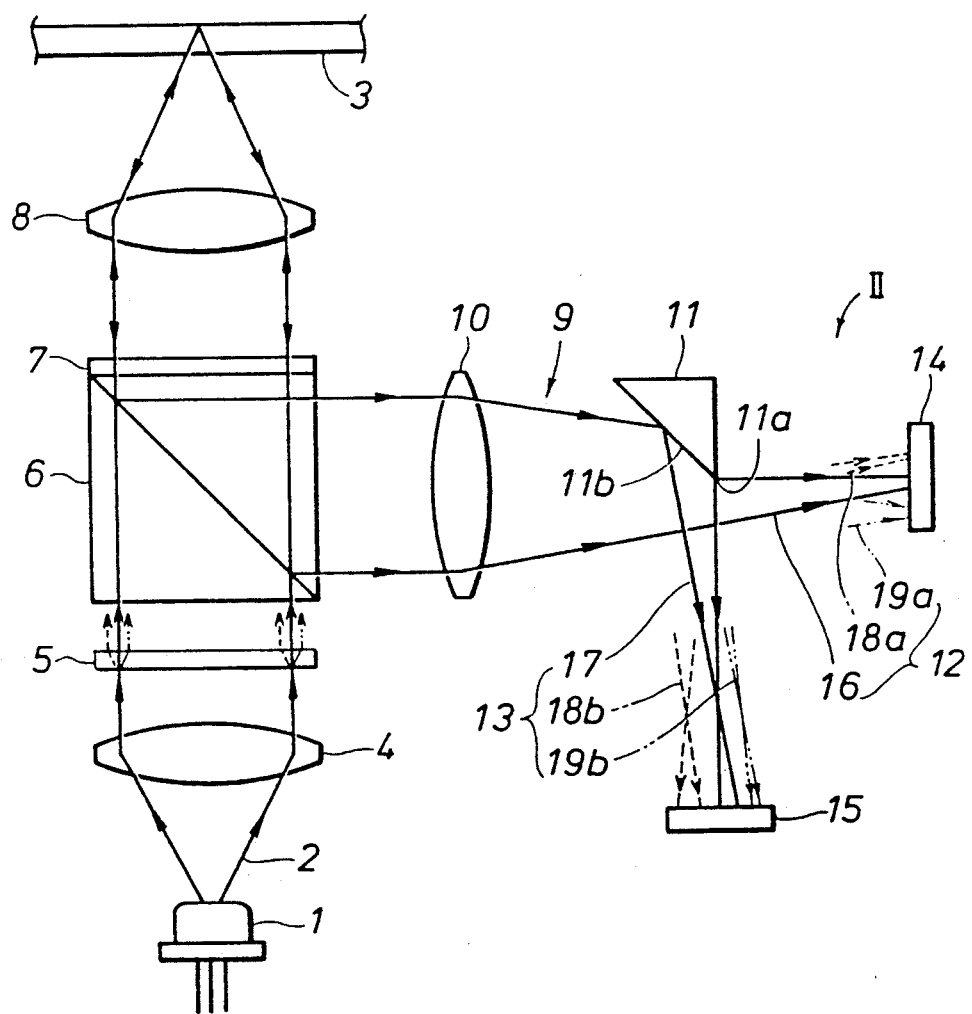
FIG. 1 is a schematic view of an optical head according to the present invention.

FIG. 1 schematically illustrates the optical system of an optical head to which the present invention is applied. A projected light beam 2 from a semiconductor laser 1 serving as a light source is projected upon a recording surface of an optical recording medium 3 shown in an upper part of the drawing, and a collimating lens 4 and a diffraction grating 5 are coaxially placed in an optical path of this projected light beam 2. This known structure combining these optical elements forms a three beam generating means for producing three beams consisting of a 0th-order diffraction light beam and the ±1st-order diffraction light beams from the projected light beam 2. Further provided in the light path of the projected light beam 2 are a polarization light beam splitter 6, a quarter-wave plate 7 and an object lens 8 for converging the three beams upon the recording surface of the optical recording medium 3, each of these optical elements being arranged in a mutually coaxial relationship.

According to the above described structure, the 0th-order diffraction light beam is projected upon information pits of the optical recording medium 3, and the ±1st-order diffraction light beams are projected upon the side edges of the track in the same way as in the conventional three beam system. The diffraction light beam (which actually consists of three beams) reflected from the optical recording medium 3 passes back through the object lens 8 and the quarter-wave plate 7, and is deflected to the right in the sense of the drawing by the polarization light beam splitter 6. A condenser lens 10 is placed in the light path of this deflected light beam in a coaxial manner to converge the deflected light beam.

In the light path of the detected light beam 9 which was converted into a converging light beam by the condenser lens 10, there is provided an edge mirror 11 serving as deflecting means for deflecting the detected light beam to mutually different two directions with a total reflection surface including a knife edge 11a extending in parallel with the direction of the tracking error so as to shield approximately half of the light path of the detected light beam 9. Therefore, the detected light beam 9 is separated into a first detected light beam 12 which advances straight ahead without being shielded by the edge mirror 11 and a second detected light beam 13 whose light path is deflected downward in the sense of the drawing by the edge mirror 11. First and second light measuring sensors 14 and 15 are placed in the light paths of the first and second detected light beams 12 and 13, respectively, slightly behind the nominal focal point in the case of the first detected light beam 12 and slightly ahead of the nominal focal point in the case of the second detected light beam 13 each by a same distance with respect to the corresponding nominal focal point. The relative positional relationships of the light measuring sensors 14 and 15 with respect to the corresponding focal points may be reversed.

Figure 2:
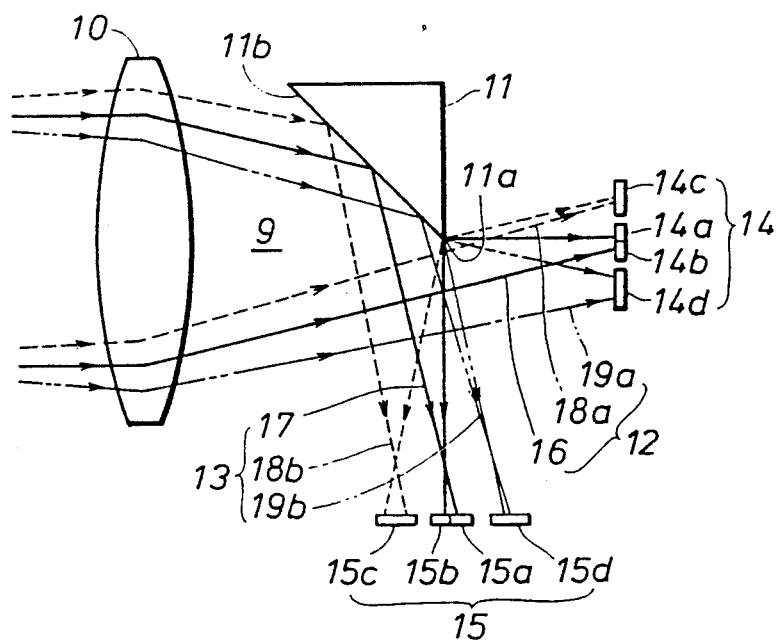
FIG. 2 is a more detailed schematic view of the part of FIG. 1 indicated by the arrow II in FIG. 1.

As shown in FIG. 2, the main beam consisting of the 0th-order diffraction light beam contained in the detected light beam 9 is separated by the edge mirror 11 into a first main beam 16 and a second main beam 17. A pair of sub beams consisting of the ±1st-order diffraction light beams contained in the detected light beam are likewise separated by the edge mirror 11 into a larger part and a smaller part or, more specifically, straightly advancing first sub beams 18a and 19a and second sub beams 18b and 19b which are reflected by the edge mirror 11. Therefore, according to the present embodiment, each of the first and second detected light beams 12 and 13 contain three beams corresponding to the 0th-order diffraction light beam and the ±1st-order diffraction light beams.

Each of the light measuring sensors 14 and 15 consists of a four-segment photodiode each consisting of four segments 14a, 14b, 14c and 14d, or 15a, 15b, 15c and 15d. The two centrally located photodiode segments 14a and 14b, and 15a and 15b of the light measuring sensors 14 and 15 placed in the light paths of the main beams 16 and 17, respectively, are used for the detection of focusing errors, and the photodiode segments 14c, 14d, 15c and 15d placed in the light paths of the sub beams 18a, 19a, 18b and 19b, respectively, on either side of the corresponding centrally located photodiode segments 14a 14b, and 15a and 15b are used for the detection of the tracking errors. Each adjacent pair of the photodiode segments 14a and 14b, or 15a and 15b are separated from each other by a line extending in parallel with the projected image of the knife edge 11a of the edge mirror 11, and detect focusing errors according to the knife edge method. The detection of tracking errors is carried out by combining the outputs from the photodiode segments 14c, 14d, 15c and 15d upon which the complementary pairs of the light spots corresponding to the sub beams 18a, 19a, 18b and 19b are projected, and finding the difference in the amounts of the received light between the complementary pairs of the photodiode segments.

Figure 3:
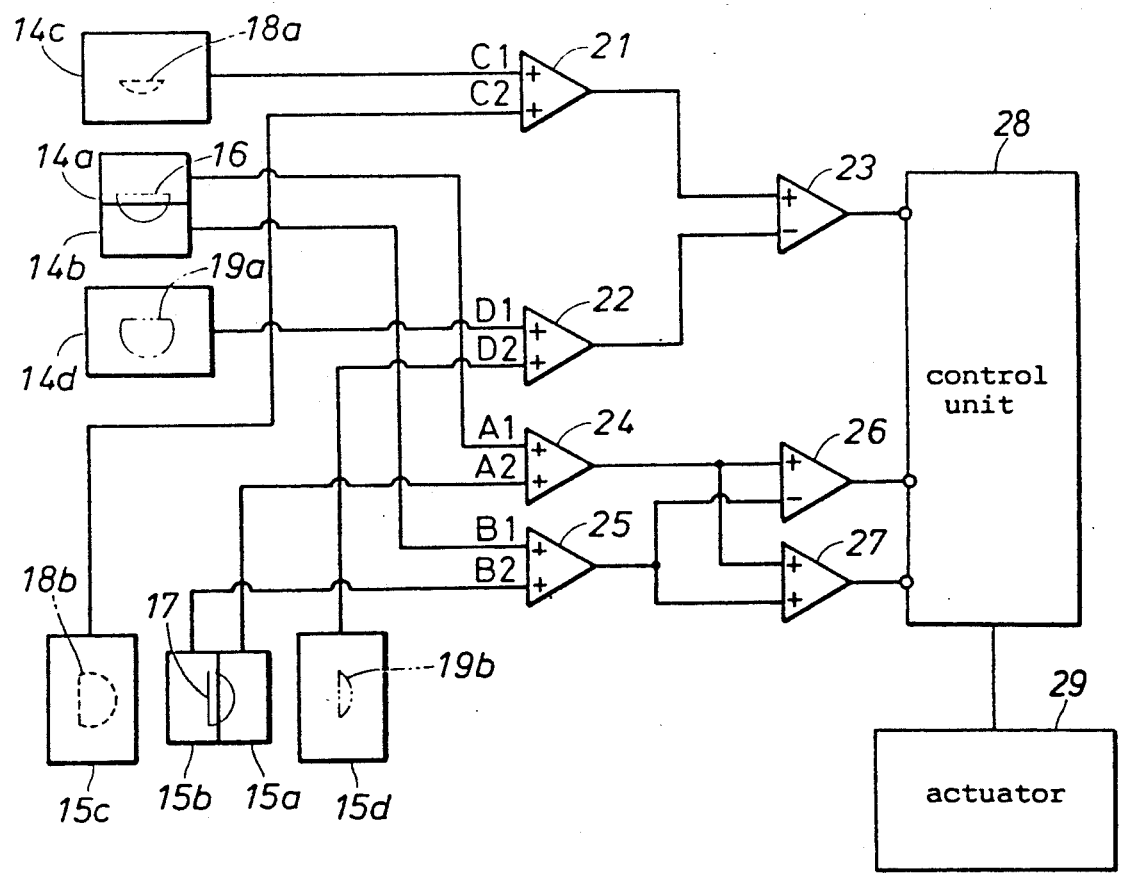
FIG. 3 is a simplified circuit diagram of the control circuit of the optical head according to the present invention.

Examples of the shapes of the light spots produced by the beams separated by the edge mirror 11 are shown on the photodiode segments 14a through 14d and 15a through 15d of FIG. 3, and the process of detecting the focusing and tracking errors as well as the process of reading information is now described in the following with reference to FIG. 3.

When there is no focusing error, the difference between the outputs from the two centrally located segments 14a and 14b or 15a and 15b of each of the two photodiodes 14 and 15 is zero. When there is no tracking error, the difference between the sum of the amounts of light received by the segments 14c and 15c of the two photodiodes and the sum of the amounts of light received by the other segments 14d and 15d of the two photodiodes is zero.

When there is a focusing error, the projected area of each of the semi-circular light spots of the main beams 16 and 17 on one of the diode segments 14a and 14b, or 15b and 15d of the corresponding photodiode 14 or 15 is enlarged while that on the other of the diode segments 14a and 14b, or 15b and 15d of the corresponding photodiode 14 or 15 is diminished in size. A tracking error causes the light spots of one of the sub beams 18 and 19 to be reduced in size in the direction perpendicular to the dividing line of each spot produced by the knife edge 11a of the edge mirror 11, and the light spot from the other of the sub beams 18 and 19 to be increased in size. A similar change in size takes place in the light beams produced by the main beams 16 and 17, but this is caused in a complementary or mutually compensatory manner with respect to the segment 14a or 14b for the light spot corresponding to the main beam 16 and the segment 15a or 15b for the light spot corresponding to the main beam 17.

This is now described in more detail with reference to the circuit diagram shown in FIG. 3.

The detected values C1 and C2 of the photodiode segments 14c and 15c receiving the sub beams 18a and 18b separated from one of the sub beams of the detected light beam are added by an amplifier 21; the detected values D1 and D2 of the photodiode segments 14d and 15d receiving the sub beams 19a and 19b separated from the other of the sub beams of the detected light beam are added by an amplifier 22; the output value of the amplifier 22 is subtracted from the output value of the amplifier 21 with an amplifier 23; and the control of the tracking error is carried out according to the output (C1+C2−D1−D2) of the amplifier 23. It is also possible to subtract the output value of the amplifier 21 from the output value of the amplifier 22 with the amplifier 23.

The focusing error control is accomplished by adding the detected values A1 and A2 of the segments 14a and 15a of the two photodiodes 14 and 15, respectively, with an amplifier 24, adding the detected values B1 and B2 of the other segments 14b and 15b of the two photodiodes 14 and 15, respectively, with an amplifier 25, subtracting the output value of the amplifier 25 from the output value of the amplifier 24 with an amplifier 26, and carrying out the focusing control with a control unit 28 and an optical head actuator 29 according to the output value (A1+A2−B1−B2) of the amplifier 26. It is also possible to subtract the output value of the amplifier 24 from the output value of the amplifier 25 with the amplifier 26 as opposed to the above mentioned case.

The recorded information can be retrieved from the output value (A1+A2+B1+B2) of an amplifier 27 which adds up the outputs of the two amplifiers 24 and 25. The outputs from the amplifiers 23 and 26 are supplied to the control unit 28 which in turn controls the optical head actuator 29 so as to eliminate the focusing and tracking errors according to the outputs from the amplifiers 23 and 26.

In the optical head having the above described structure, when a tracking error occurs, the crescent shaped light spots of the main beams 16 and 17 on the photodiode segments 14a, 14b, 15a and 15b are simply hidden or eclipsed accordingly along the dividing lines of the corresponding light spots, and the detected values A1, B1, A2 and B2 of the segments 14a, 14b, 15a and 15b would never change. Therefore, the cross talk on the focusing error signal from tracking error can be avoided. Since the photodiode segments 14c, 14d, 15c and 15d are combined in a complementary or mutually compensatory relationship and handled in the same way as in the known three beam method, a stable tracking error control is possible. Further, since the light measuring sensors 14 and 15 are arranged symmetrically or in mutually compensatory manner with respect to the focal points of the detected light beams 12 and 13, and the detected value of the focusing error changes in a symmetric manner in the light measuring sensors 14 and 15, it is possible to improve the linearity of the focusing control signal.

The structure described with reference to FIG. 1 utilized a polarization light beam splitter 6 and a quarter-wave plate 7 in its optical system, but they may be replaced with a simple beam splitter without any polarized light property.

According to the present invention, a focusing control free from cross talk from tracking errors can be achieved, and a tracking error control which is as stable as that by the three beam method is possible. Further, by combining the light measuring sensors in a mutually compensatory manner, it is possible to improve the linearity of the focusing control. The present invention can thus offer significant advantages.

Although the present invention has been described in terms of specific embodiments, it is possible to modify and alter details thereof without departing from the spirit of the present invention.

What we claim is:

1. An optical head, comprising:
   a light source;
   three beam generating means for producing a 0th-order diffraction light beam and ±1st-order diffraction light beams from a light beam obtained from said light source and projecting said diffraction light beams upon an optical recording medium;
   light deflecting means for separating each of said diffraction light beams reflected by a recording surface of said optical recording medium into two light beams oriented in and along a first light path and a second light path, respectively;
   first focusing control optical sensor means placed in said first light path a short distance in front of a nominal focal point of said 0th-order diffraction light beam for receiving said 0th-order diffraction light beam;
   a pair of first tracking control optical sensor means placed each on either side of said first focusing control optical sensor means for receiving said ±1st-order diffraction light beams, respectively;
   second focusing control optical sensor means placed in said second light path a short distance beyond a nominal focal point of said 0th-order diffraction light beam for receiving said 0th-order diffraction light beam;
   a pair of second tracking control optical sensor means placed each on either side of said second focusing control optical sensor means for receiving said ±1st-order diffraction light beams, respectively; and
   detection means for detecting a focusing error and a tracking error according to outputs from said sensor means and actuating said optical head so as to eliminate said focusing and tracking errors.

2. An optical head according to claim 1, wherein said light deflecting means separates said 0th-order diffraction light beam so as to form two semi-circular light spots on said first and second focusing control optical sensor means, respectively, and each of said first and second focusing control optical sensor means consists of a pair of photoelectric segments divided by a line offset from a center of the corresponding semi-circular light spot.

3. An optical head according to claim 2, wherein said light deflecting means comprises a mirror having a knife edge extending along the direction of a tracking error, said knife edge separating said ±1st-order diffraction light beams each into a larger light spot and a smaller light spot impinging upon a different one of said first tracking control sensor means and a different one of said second tracking control sensor means, respectively.

4. An optical head according to claim 3, wherein said detection means comprises a first adder for adding outputs from a pair of said tracking control sensor means corresponding to said ±1st-order diffraction light beam, a second adder for adding outputs from a pair of said tracking control sensor means corresponding to said −1st-order diffraction light beam, a third adder for adding outputs from a complementary pair of segments of said focusing control optical sensor means, a fourth adder for adding outputs from the other complementary pair of segments of said focusing control optical sensor means, a first subtracter for carrying out a subtraction between outputs from said first and second adders, a second subtracter for carrying out a subtraction between outputs from said third and fourth adders, and a fifth adder for adding up outputs from said third and fourth adders.

5. An optical head according to claim 1, wherein said light source consists of a semiconductor laser, and said control sensor means consist of a combination of multi-segment photodiodes.

* * * * *